Patented Sept. 30, 1930

1,776,875

UNITED STATES PATENT OFFICE

RUDOLF WIETZEL, OF LUDWIGSHAFEN-ON-THE-RHINE, AND ERNST WILLFROTH, OF NEUROSSEN, GERMANY, ASSIGNORS TO I. G. FARBENINDUSTRIE AKTIENGESELL-SCHAFT, OF FRANKFORT-ON-THE-MAIN, GERMANY, A CORPORATION OF GERMANY

CATALYST OF HIGH MECHANICAL STRENGTH

No Drawing. Application filed February 29, 1928, Serial No. 258,152, and in Germany March 3, 1927.

This invention relates to the production of catalysts of high mechanical strength which are adapted for carrying out the "destructive hydrogenation" of distillable carbonaceous substances, that is the treatment of materials of the nature of coal, tars, mineral oils and the like and of the distillation and conversion products thereof with hydrogen or gases containing or forming hydrogen at elevated temperatures and preferably under elevated pressure. It has been shown elsewhere that this process, the object of which is the conversion of the initial materials into more valuable, chiefly liquid products, is greatly improved by the employment of catalysts. However, troubles may occur in this process, in particular when catalysts of oxidic nature are employed, since owing to the comparatively low mechanical strength of the catalysts, the gases and vapors passed over them take up catalyst dust, which leads to congestion of the apparatus, pollution of the reaction product and the like.

We have now found that all troubles in the said destructive hydrogenations due to the low mechanical strength of the catalysts are avoided, if magnesium salts soluble in water be incorporated with the catalytic material during the production of the said catalysts. Thus for example additions of magnesium chlorid, magnesium sulfate and magnesium nitrate are very suitable for the said purpose.

The production of the catalyst is usually carried out by incorporating one or more water soluble magnesium salts, preferably in the form of an aqueous solution, with a component of the catalyst to a solid mass and driving out the acid. If desired other catlytic components are thereupon incorporated with the product thus obtained, for example by impregnation with an aqueous solution of the said components.

Owing to the mechanical properties of the catalyst thus obtained, no decrease in the catalytic activity of the catalyst is observed.

The said catalysts have the further advantage of not caking when in use.

The following examples will further illustrate how our invention may be carried out in practice, but the invention is not limited to these examples. The parts are by weight.

Example 1

An excellent catalyst of high mechanical strength is obtained by making up a stiff paste of zinc oxid with magnesium chlorid solution, so that the mixture contains about 10 parts of magnesium chlorid to 100 parts of zinc oxid. The paste is then dried and pressed and the hydrogen chloride is expelled by heating in air or in a current of inert gas, the resulting product being then impregnated with chromic acid.

A like excellent catalyst is obtained if in the above example manganese oxid is employed in place of zinc oxid.

The aforesaid catalysts are excellently adapted for use in the destructive hydrogenation process.

Example 2

If a catalyst consisting of 100 parts of molybdic acid and 40 parts of zinc oxid be employed for the destructive hydrogenation of mineral oils in the vapor phase at 480° C. in the presence of hydrogen in excess at 200 atmospheres pressure, a good yield of benzines is obtained. But this catalyst may disintegrate easily with the formation of dust, and channels may be formed within the catalyst, so that its activity soon decreases very considerably. If, however, in the production of the said catalyst 20 per cent of magnesium chlorid based on the weight of the zinc oxid be added, a catalyst of high mechanical strength is obtained, which may be employed for a very long time. Moreover the yield of products boiling below 200° C. is increased by 5 to 10 per cent.

What we claim is:

1. In the production of a catalyst for the destructive hydrogenation of distillable carbonaceous materials, the step of increasing its mechanical strength by incorporating with a component of the said catalyst during its production a magnesium salt soluble in water.

2. In the production of a catalyst for the destructive hydrogenation of distillable carbonaceous materials, the step of increasing its mechanical strength by incorporating with a component of the said catalyst during its production a magnesium salt soluble in water, expelling the acid combined therewith by heating and impregnating the mass with further components of the said catalyst.

3. In the production of a catalyst for the destructive hydrogenation of distillable carbonaceous materials, the step of increasing its mechanical strength by incorporating at least one component of the said catalyst during its production with an aqueous solution of a magnesium salt.

4. In the production of a catalyst for the destructive hydrogenation of distillable carbonaceous materials, the step of increasing its mechanical strength by incorporating with a component of the said catalyst during its production magnesium chloride expelling the hydrogen choride and impregnating the mass with further components of the said catalyst.

5. A process for the production of a catalyst of increased mechanical strength for the destructive hydrogenation of distillable carbonaceous materials, which comprises incorporating magnesium chloride with molybdic acid and zinc oxide during the production of the said catalyst and expelling hydrogen chloride by heating.

In testimony whereof we have hereunto set our hands.

RUDOLF WIETZEL.
ERNST WILLFROTH.